April 27, 1954     R. A. FATOUX     2,676,576
ROTARY INTERNAL-COMBUSTION ENGINE
Filed Dec. 28, 1951     4 Sheets-Sheet 1
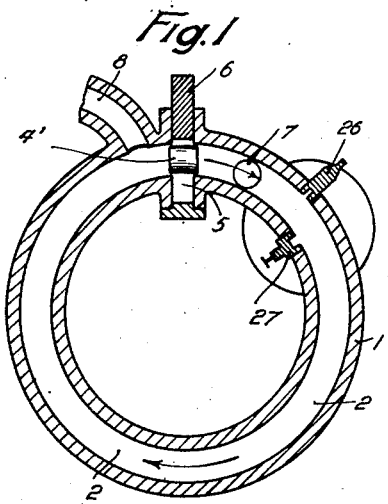
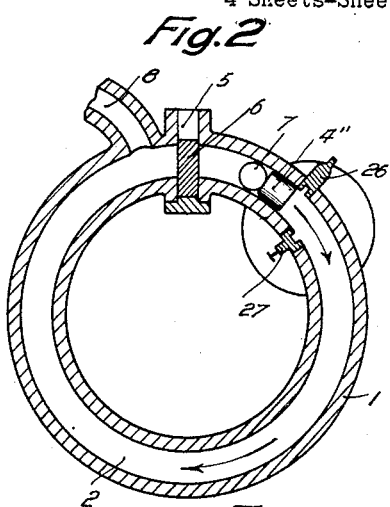
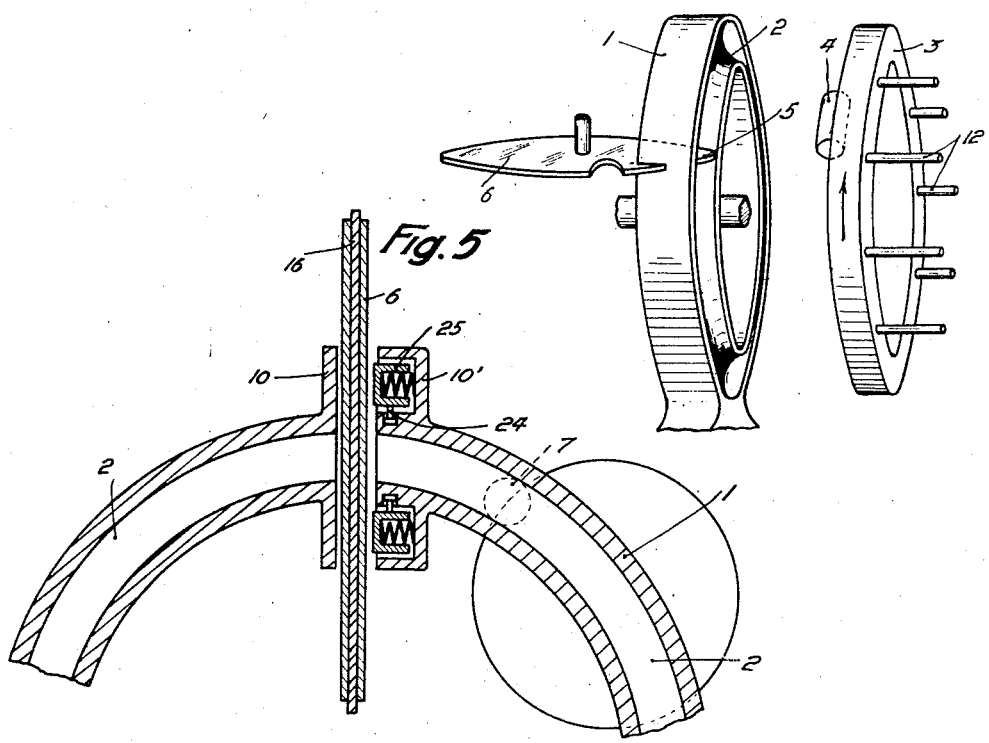
INVENTOR:
Raymond Albert Fatoux
By
Frank H. Wisch
Atty.

April 27, 1954   R. A. FATOUX   2,676,576
ROTARY INTERNAL-COMBUSTION ENGINE
Filed Dec. 28, 1951   4 Sheets-Sheet 2
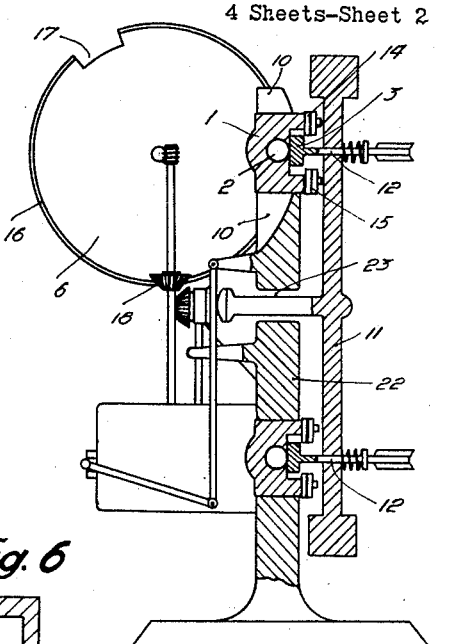
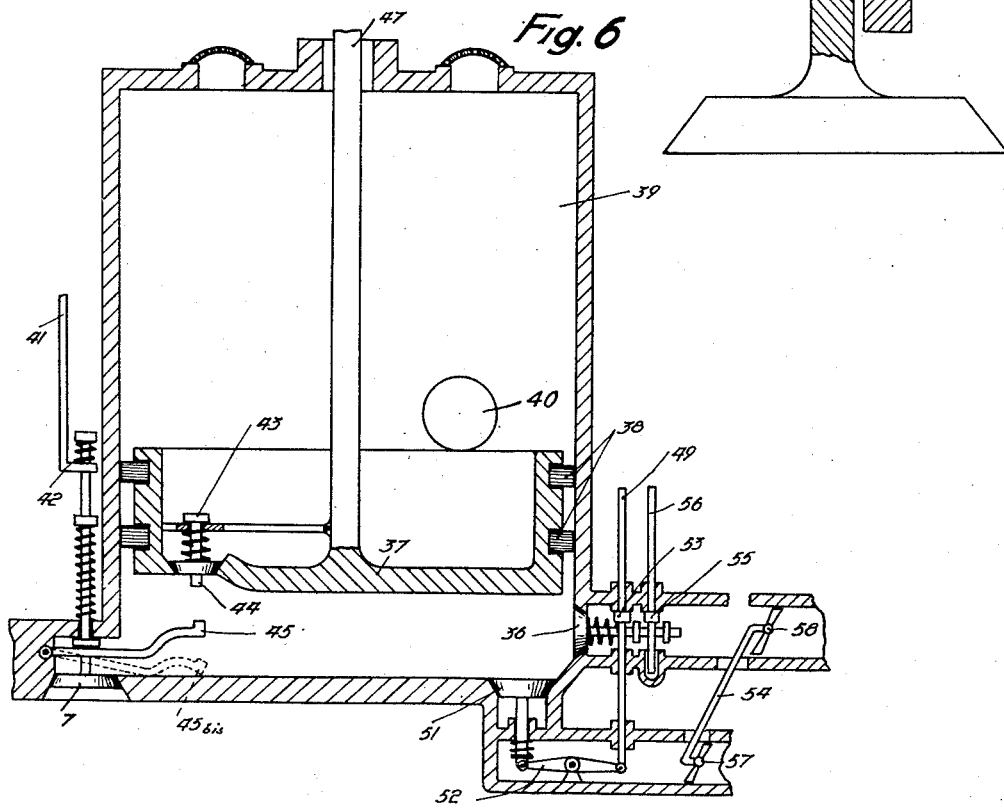
INVENTOR:
Raymond Albert Fatoux
By Frank H. Wisch
Att'y.

April 27, 1954  R. A. FATOUX  2,676,576
ROTARY INTERNAL-COMBUSTION ENGINE
Filed Dec. 28, 1951  4 Sheets-Sheet 3

INVENTOR:
Raymond Albert Fatoux
By Frank H. Hirsch
Att'y.

April 27, 1954  R. A. FATOUX  2,676,576
ROTARY INTERNAL-COMBUSTION ENGINE
Filed Dec. 28, 1951  4 Sheets-Sheet 4
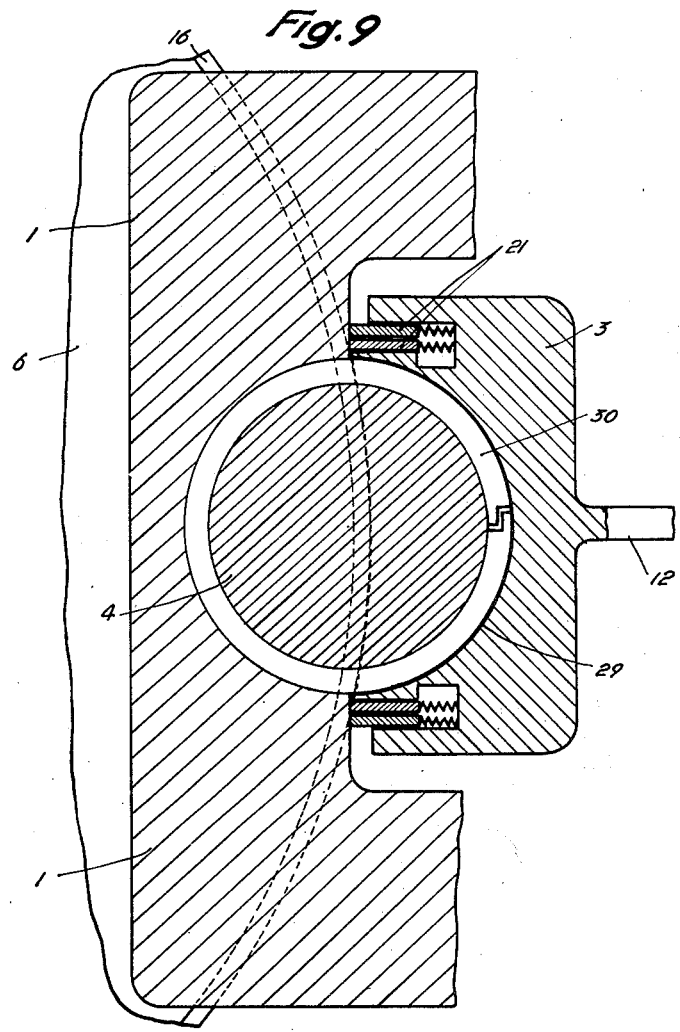
Fig. 9
Fig. 10
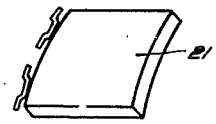
INVENTOR:
Raymond Albert Fatoux
By Frank H. Hisch
Att'y.

UNITED STATES PATENT OFFICE 2,676,576

ROTARY INTERNAL-COMBUSTION ENGINE

Raymond Albert Fatoux, Neuilly-sur-Seine, France

Application December 28, 1951, Serial No. 263,811

2 Claims. (Cl. 123—13)

My invention has for its object a novel internal combustion engine having a high thermic efficiency. My invention has more particularly for its object means for preparing the gasiform charge under a high compression in an approved manner with reference to that provided hitherto in piston-operated engines while on the other hand it allows, after ignition of the mixture, directing the expanding gases onto a rotor to further the rotary movement thereof, the usual drawbacks of gas turbines such as a poor thermic efficiency, exaggerated speed, exaggerated heating of the rotor and the like being cut out. My improved engine may operate with various kinds of liquid fuel fed to it either by means of a conventional carburettor or of a conventional injection pump.

My engine may provide one or more driving impulses per revolution and the different elements of the engine thus constituted may be rigidly secured together after the manner of a conventional multi-cylinder engine.

My invention has still further for its object means for connecting the stator and the rotor in a manner such that on one hand each member may be suitably cooled, which allows using standard material for the reactor or propelling turbine, instead of expensive alloys that are inconsistent with mass production. Furthermore, this allows operation without any jamming after the manner of a volumetric pump with the advantages that may arise therethrough.

The "semi-turbine" according to the invention includes a stator on one of the surfaces of which is provided a torus-shaped groove while the rotor carries a piston engaging said torus and adapted to slide fluidtightly therein. The engine further includes a disc engaging a cut provided in the stator and adapted to close transversely the torus-shaped groove, said disc being driven into rotation in synchronism with the rotor and being provided with a notch uncovering the groove at the moment at which the piston passes in front of the disc while an exhaust port is arranged behind the cut engaged by the disc in the direction of rotation of the rotor and an input pipe opens into the torus-shaped groove ahead of and in the vicinity of said cut considered in the same direction of rotation, said pipe being connected with the generator of a compressed explosive mixture under control of a valve.

Fluidtightness is obtained through the agency of two double segmental packing rings of cylindrical shape the joints between the segments of which cross one another, said segments being carried by the rotor and engaging the stator surface respectively inside and outside the torus-shaped groove.

The generator producing the compressed explosive mixture is constituted preferably by a piston pump sucking the desired mixture or the successive portions thereof and delivering the latter through the pipe controlled by the valve into the torus-shaped groove of the stator.

I will now describe my invention with further detail, reference being made to accompanying drawings, wherein:

Fig. 1 is a diagrammatic view of the turbine with the piston in register with the cut-closing disc.

Fig. 2 is a diagrammatic view of the turbine, the piston being shown in the position occupied at the moment of the explosion.

Fig. 3 is an exploded perspective view of the same turbine.

Fig. 4 is a cross-section of the turbine.

Fig. 5 is a detailed cross-section showing the means for providing fluidtightness of the cut-closing disc.

Fig. 6 is a sectional view of the compressor pump.

Fig. 9 is a corresponding view through the piston rigid with the rotor.

Figure 7:
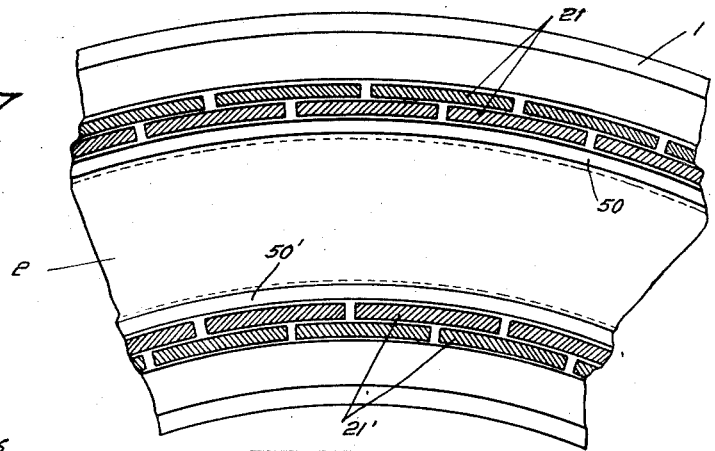
Fig. 7 is an elevational view of a part of the rotor showing the arrangement of the fluidtight rings.

My "semi-turbine" includes chiefly a stator 1 inside which is provided an annular groove assuming the shape of a torus opening laterally, as shown at 2, and a rotor 3 associated coaxially with the stator and revolving in proximity therewith, whereby the torus-shaped groove is closed by the rotor to form an annular perfectly closed tunnel-shaped chamber.

The rotor 3 carries rigidly a piston 4 of cylindrical cross-section matching exactly the shape of the annular chamber and adapted to move therein fluidtightly. The stator is slotted at 5 in a radial direction through said groove and a rotary disc 6 is inserted in said slot so as to close fluidtightly through its periphery the torus-shaped chamber 2 during the major part of the cycle of the engine, said disc providing an opening during a short moment corresponding to the passage of the piston through the cut or slot 5. A transfer valve 7 communicating with a compressor 39, pressure-reducing means 26 provided for starting, a spark plug 27 and, if required, injecting means are also provided for the engine.

The operation of the engine is as follows:

The piston 4 starts from the position 4' (Fig. 1) for which the cut-closing disc has receded to allow its passage, and when this piston has reached the position 4" (Fig. 2), the disc or gate 6 has finished its return movement into its operative position for which the chamber is fluidtightly closed transversely up to the end of the cycle, said disc playing then the part of a conventional cylinder end. The piston is now in register with the transfer valve 7 which opens and a load of carburetted mixture is delivered under pressure by the compressor into the space separating the disc 6 from the rear end of the piston. Throughout this feeding stage, it is obvious that the piston will travel and produce consequently a certain suction between its rear end and the disc; but the arrangement is designed in a manner such that the volume of gases, introduced during a predetermined time, while remaining of a suitable magnitude, is larger than the expansion of volume produced by the progression of the piston during the same time. Consequently, during the filling stage and in spite of the forward movement of the piston, the pressure of the gases introduced increases gradually. At the moment of the starting of the engine, the pressure-reducer 26 should be operated and the piston may reach the point 27 registering with the spark plug that provides for the ignition of the mixture and the closing of the transfer valve 7 under compression. The engine being thus started, the compression may be sufficient even before the piston has reached the spark plug 27 for producing self-ignition without any danger of jerks in the driven mechanism which rotates permanently in the same direction. As soon as the gases have been ignited, their expansion is produced between the disc 6 and the rear end of the piston. The latter is consequently driven in the direction of the arrow, together with the rotor with which it is rigid and the said piston drives forwardly through its front end the burnt gases formed during the preceding cycle. These gases abut against the closed disc 6 and are delivered into the exhaust pipe 8 and this continues until the piston reaches again the position 4'. At this moment, the gases that have expanded in contact with the rear surface of the piston are now in register with the exhaust pipe through which they are exhausted freely insofar as they are still submitted to a residual pressure and the non-exhausted portion remains temporarily inside the annular chamber until the next cycle, during which these gases are taken up and scavenged in their turn through the pressure exerted by the front end of the piston, as disclosed hereinabove.

The operation, in the case of a fuel injector, is similar, except for the fact that pure air is introduced by the compressor pump into the space between the disc 6 and the rear end of the piston, up to the moment at which the piston registers with the injector, the injection being associated with a self-ignition of the combustible gases.

Whether the engine operates with a carburettor or with an injector, it is necessary to provide several driving impulses per revolution on the same piston and, to this end, there are provided at suitable points of the annular chamber similar sets comprising each a closing disc, a transfer valve, a compressor, pressure-releasing means, a spark plug or an injector as required, each of which parts is operative once per revolution.

The mounting of the rotor on the stator is obtained as follows:

The frame 22 of the stator (Fig. 4) carries revolubly at 23, inside its hub, a flywheel 11. This flywheel carries, at equal distances from one another along an annular line, fluted rods 12 on which is fitted an annular rotor 3 coaxial with the stator, which rotor may thus revolve in the immediate proximity of the torus-shaped groove 2 in the stator.

Figure 8:
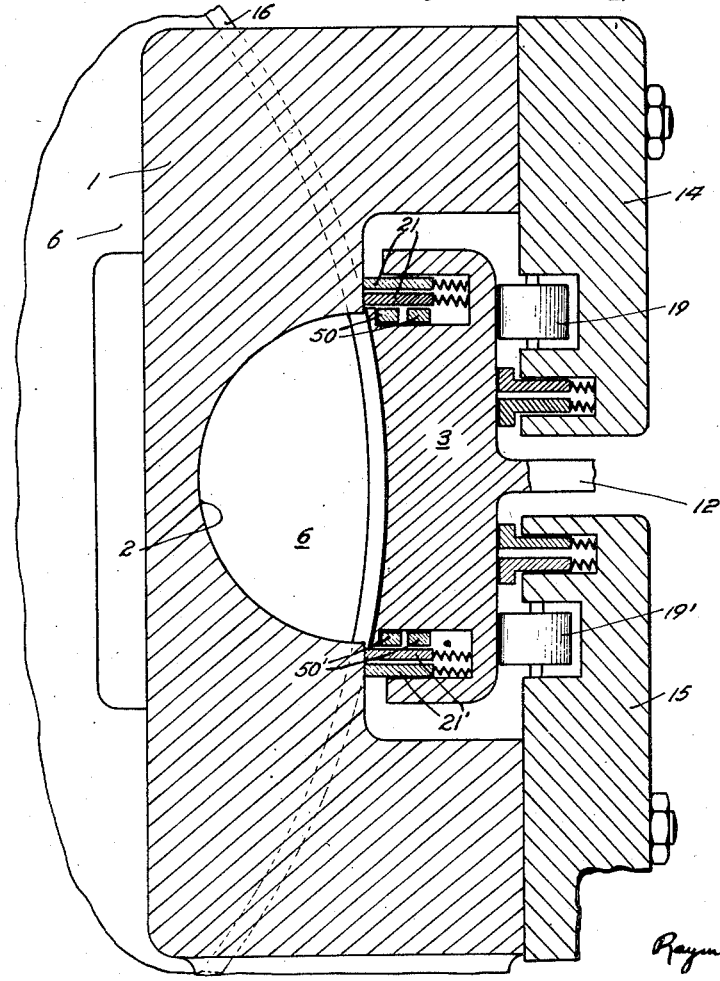
Fig. 8 is a sectional view on a larger scale of the fluidtight means at a point of their length.

At a suitable point 5 of the stator is provided a transverse slot forming a complete opening for the annular torus-shaped chamber while leaving untouched the portion of the stator carrying the rings 14 and 15 engaging the side of the rotor (Fig. 8). This slot forms a sort of gap of predetermined breadth between two flanges 10 and 10' (Fig. 5). The disc 6 is constituted preferably by a rotary member driven by the bevel gear and worm gear shown diagrammatically at 18 in Fig. 4. Said disc 6 is notched at 17 and throughout the remainder of its periphery, its edge carries annular conventional fluidtight packing ring elements 16. It is driven by a fluted spindle over which it may slide axially to a slight extent; said valve is engaged through its periphery between the stationary flange 10 of the gap 5 and the flange 10' that may expand through the operation of the closing hoop 25, the fluidtightness of the system being made complete by the packings 24.

While the disc 6 revolves between the two flanges defining the gap 5, it is urged by the hoop against the flange 10 while said hoop 25 closes in its turn the gap between the flange 10' and the corresponding side of the disc or gate 6 so as to provide for the fluidtightness of the transverse closure of the annular torus-shaped chamber.

The disc 6 engages through its periphery the rotary central cup-shaped hub of the rotor and its radius is equal to that of said cup-shaped hub engaging it, the axes of rotation of both members being orthogonal, and the periphery of the disc is provided as stated with expansible conventional packing ring elements 16 which provide for fluidtightness between the parts contacting with each other.

The fluidtight closure of the gap 5 is thus ensured in all directions as long as the solid portion of the disc 6 engages the gap i. e. during the major portion of the cycle. But at the moment at which, on the contrary, the piston advances towards the gap and is about to pass through same, the notch 17 in the disc registers with the inside of the chamber and allows the piston to pass freely through the gate or disc the time required for said passage.

The rotary rim of the rotor 3 is provided near its outer periphery with a large annular groove that serves for the housing of a circular system of packing members 21. A second groove is provided coaxially with the first one and is located near the inner periphery of the annular rim and serves for housing a second system of packing members 21' (Fig. 8). These packing rings are constituted by metal plates that are urged by coil or blade springs out of their grooves in order to frictionally engage through their outer edges the cooperating surface of the stator, each system of packing members 21—21' being constituted by at least two rows of such members, the joints between the members of the two rows being shifted peripherally.

The two systems of packing members are held transversely in their recesses by two coaxial expansible rings 50—50' operating statically and urging the packing members towards the side wall of their grooves in association with the action of the pressure prevailing inside the annular chamber of the engine, said packing members closing completely any lateral clearance so as to prevent the gases from escaping beyond the rings 50—50'.

Said members 21 and 21' engage edgewise the stator under conditions that are similar to those in which a conventional piston would rotate inside the cylinder.

The packing members referred to are sufficiently numerous and are bestowed with a sufficient freedom inside their groove to allow a certain degree of warping of the surface of the stator engaged by them, whereby the fluidtightness of the chamber may always be obtained without any danger of wedging.

The rotor carries the piston that is surrounded after the manner of a conventional piston by an elastic expansible ring 30, the cross-section of which corresponds with that of the annular chamber. Said segment engages fluidtightly the stator and also, for a portion of its periphery, it engages statically the space 29 extending between the piston and the actual body of the rotor to form a mere filling therebetween. The slot allowing the expansion of said single packing ring 30 is located at the bottom of said space 29 so that obviously it cannot allow the escape of any gas as the gases are arrested by the packing ring at the input end of the space 29.

The fuel-feeding pump 33 (Fig. 6) communicates with the combustion chamber 2 through a semi-automatic transfer valve 7 as described, which valve may be locked during the major part of the cycle so as to remain closed, by a rod 41 controlled by a cam that is not illustrated, with the interposition of damping means 42. Except for the transfer period, the pump operates inside a separate chamber, independently of the operation inside the annular chamber. The pump piston 37 is controlled by two cams that are not illustrated and the shape of which is such that the piston is submitted to variable speeds during the successive stages of its operation.

A valve 51 is provided at the output end of a pipe fed by a conventional gasoline carburettor including a standard throttle valve 57. Said valve 51 is controlled through a variable outline cam that is not illustrated, and the lateral shifting of which may be adjusted at any moment by the operator, in a manner such that the opening of said valve may assume a varying duration, without however the valve remaining open, when the piston has reached midway of its upward stroke.

A further valve 36 controls another pipe also provided with a conventional throttle valve 58 and fed by a carburettor of a substantially conventional type but fed with a cheap heavy fuel, such as kerosene, for instance. This valve 36 is held locked by a sloping member 53 as long as the valve 51 is in its open position; when the piston has reached midway of its upward stroke, the valve 36 is similarly locked by the sloping member 55 on the rod 56 controlled by an ordinary cam, that is not illustrated. At any other moment, the valve 36 operates in a purely automatic manner. The two throttle valves 57 and 58 are associated and controlled by the usual accelerator pedal or the like control means.

It is thus apparent that the operator may, on one hand, act on such an accelerator pedal to adjust the total amount of gases sucked into the compressor and, on the other hand, he may provide for the superposition in said gaseous mixture of a more or less thick layer of a mixture of gasoline and air followed by a proportionally more or less thick layer of heavy fuel and air.

Each of the two associated carburettors may include a single nozzle feeding a mixture, the richness of which is double that constituted by the poorest mixture that is capable of burning.

During the suction stroke executed at a comparatively reduced speed, the piston sucks through the open valve 51 a more or less considerable layer of rich light gases; as soon as said valve closes, the valve 36 is free and feeds a layer of heavier gases into the space between the piston and the first layer. When the piston enters its midway position, the valve 36 closes and the piston uncovers at 48 an automatic valve fed with filtered additional air, said valve 48 opening under the action of the reduction in pressure. Up to the end of the suction stroke, a certain amount of air may thus fill the interval between the layer of heavier gases and the actual piston, this amount corresponding to one half of the cylinder volume when operating under full power conditions and even more under reduced power conditions.

The transfer valve 7 being then locked, the pump piston may, without any danger, begin its compression inside a closed chamber, whatever may be the position of the engine piston inside the annular chamber. The pump piston sinks at a mean speed down to midway so as to compress the contents of the cylinder under conditions such that no self-ignition is to be feared (compression ratio 2/1). At this moment, the piston 3 has just reached a position in register with the transfer valve 7 which is now released by its cam and opens. The light gases first and then the heavy gases are thus transferred under pressure, through the valve 7, to the rear surface of the piston 3 with a change in direction that gives them a certain turbulence. This leads to a stirring of the gasiform mixture and a mixing of the molecules to the front of the heavy gas layer with the molecules at the rear of the gasoline mixture.

From this moment onwards, the pump piston is accelerated and drives the remainder of the charge constituted by pure air under turbulent conditions furthering its mixture with the adjacent portion of the heavy mixture.

Inside the annular chamber and between the rear end of the rotor piston and the disc 6, there is thus provided a narrow elongated column of gases including: a highly inflammable gasoline and air mixture; a mixture of gasoline and heavy fuel with air; heavy fuel admixed with air; pure air.

Although the rotor piston continuing its rotation produces a certain suction behind it, the pressure increases however behind it because, on one hand, the volume of the charge is, for any time interval, considerably larger than the volume left free by the progression of the piston during the same time and, on the other hand, the speed of introduction of the load is higher than the speed of progression of the piston inside the annular chamber.

The pressure increases thus constantly until the rotor piston has come into register with the location of the spark plug which ignites the gasiform mixture, unless the compression has previously reached a sufficient value for the spontaneous burning of the gases which leads to no drawback during operation, as the rotor piston always moves in the same direction and no untimely ignition may be feared.

The rich gasoline mixture burns obviously easily and its combustion is transmitted to the mixture containing both gasoline and heavy fuel and then to the mixture of heavy fuel with pure air, and finally to the maximum amount of air with which the remaining combustible gases may burn. Under full power conditions, the column of air is completely used up and the burning charge, although it ignites as easily as an exaggeratedly rich mixture, forms finally the poorest mixture capable of burning, taking into account that the use of an extra-poor mixture shows in the present case none of the usual drawbacks, as the arrangement includes no exhaust valve that may burn. If, on the contrary, the throttle valves 57 and 58 have been opened only partly, the engine works under reduced power conditions and the pump sucks in first only more or less expanded gases that fill half the volume of the cylinder, and when the additional air valve 48 opens the cylinder volume is filled through the introduction of an amount of air, the volume of which is larger than half the volume of the cylinder. At the moment of the combustion, there remains therefore at the rear of the load a certain amount of air that cannot burn; however this column of air is not undesirable and it behaves after the manner of a buffer that separates the disc 6 from the burning gases and provides for constancy of compression under reduced power conditions.

As soon as the expansion of the gases begins, it produces automatically the closing of the transfer valve 7; it is possible that, at this moment, the pump piston has not yet finished its expansion stroke and a safety valve 43 is provided, in order to avoid any unnecessary compression stress. The spring associated with said safety valve is gauged in a manner such that it cannot operate automatically during the compression stage. When, on the contrary, the transfer valve 7 is closed, it provides for the rising movement of a rocking member 45 which may come into contact with a projection 44 on the valve 43 to provide positively for the opening of the latter; the air that is not necessary to transfer into the compression chamber can therefore pass through the valve 43 and towards the exhaust to the shifting valves 47.

What I claim is:

1. A rotary internal combustion engine comprising a stator provided with an annular chamber of uniform circular cross-section opening into a plane surface perpendicular to the axis of the chamber and with at least one radial gap passing through the chamber, two annuli coaxial with the chamber, rigid with the stator and separated by an annular gap registering with the medial line passing through the centers of the cross-sections of the chamber, a rotor adapted to revolve round the axis of the chamber, an annular member engaging the space between the surface of the stator into which the chamber opens and the two annuli, rods extending in parallelism with the chamber axis through the gap between the two annuli and connecting the rotor with said annular member to constrain it to revolve in unison with the rotor, a piston rigid with the annular member and fluidtightly engaging the chamber, a rotary disc engaging fluidtightly the chamber through each gap to provide a transient closure therefor and having an aperture adapted to register with the cross-section of said chamber, synchronizing means whereby said opening operatively engages the chamber when the piston passes through the location of the disc, means for feeding a combustible mixture to the chamber ahead of each gap, means for igniting said combustible mixture in the chamber, means for exhausting the burnt gases just behind each gap, double fluidtight means carried by the annular member, in register with the surface of the stator in which the chamber opens along two lines coaxial with the rotor and lying to either side of the chamber opening and each including two elastic rings and two series of concentric circular systems of packing ring elements arranged in staggered formation and adapted to be urged radially by the cooperating rings and means urging said systems into fluidtight cooperation with the surface of the stator on the corresponding side of the chamber opening.

2. A rotary internal combustion engine comprising a stator provided with an annular chamber of uniform circular cross-section opening into a plane surface perpendicular to the axis of the chamber and with at least one radial gap passing through the chamber, two annuli coaxial with the chamber, rigid with the stator and separated by an annular gap registering with the medial line passing through the centers of the cross-sections of the chamber, a rotor adapted to revolve round the axis of the chamber, an annular member engaging the space between the surface of the stator into which the chamber opens and the two annuli, rods extending in parallelism with the chamber axis through the gap between the two annuli and connecting the rotor with said annular member to constrain it to revolve in unison with the rotor, a piston rigid with the annular member and fluidtightly engaging the chamber, a rotary disc engaging fluidtightly the chamber through each gap to provide a transient closure therefor and having an aperture adapted to register with the cross-section of said chamber, synchronizing means whereby said opening operatively engages the chamber when the piston passes through the location of the disc, means feeding, ahead of each gap, a mixture of gradually decreasing richness, means for igniting said combustible mixture in the chamber, means for exhausting the burnt gases just behind each gap, double fluidtight means carried by the annular member, in register with the surface of the stator in which the chamber opens and engaging said surface.

References Cited in the file of this patent
UNITED STATES PATENTS

| Number | Name | Date |
|---|---|---|
| 424,000 | Hibbard | Mar. 25, 1890 |
| 1,766,248 | Ericsson | June 24, 1930 |
| 1,828,207 | Stone | Oct. 20, 1931 |
| 2,010,797 | Archbold et al. | Aug. 6, 1935 |